(12) United States Patent
McCann et al.

(10) Patent No.: US 9,019,974 B2
(45) Date of Patent: Apr. 28, 2015

(54) MULTIPLE ACCESS POINT NAME AND IP SERVICE CONNECTIVITY

(71) Applicant: BlackBerry Limited, Waterloo (CA)

(72) Inventors: Stephen McCann, Southhampton (GB); Michael Peter Montemurro, Mississauga (CA); Stefano Faccin, San Francisco, CA (US); David Philip Hole, Southhampton (GB); Stephen Barrett, Thatcham (GB)

(73) Assignee: BlackBerry Limited, Waterloo, Ontario (CA)

( * ) Notice: Subject to any disclaimer, the term of this patent is extended or adjusted under 35 U.S.C. 154(b) by 212 days.

(21) Appl. No.: 13/661,574

(22) Filed: Oct. 26, 2012

(65) Prior Publication Data

US 2014/0119353 A1    May 1, 2014

(51) Int. Cl.
*H04L 12/28* (2006.01)
*H04L 29/06* (2006.01)
*H04L 29/12* (2006.01)

(52) U.S. Cl.
CPC ......... *H04L 69/161* (2013.01); *H04L 29/12009* (2013.01)

(58) Field of Classification Search
USPC .......... 370/338, 331, 401, 349; 455/445, 433, 455/440
See application file for complete search history.

(56) References Cited

U.S. PATENT DOCUMENTS 6,950,655 B2 *  9/2005  Hunkeler ................... 455/426.1
6,978,023 B2 * 12/2005  Dacosta ........................ 380/258
8,131,209 B1 *  3/2012  Chen et al. ................... 455/11.1
8,831,568 B2 *  9/2014  Cherian et al. ............... 455/411
2013/0223421 A1 *  8/2013  Gundavelli et al. ......... 370/338
2013/0265985 A1   10/2013  Salkintzis

FOREIGN PATENT DOCUMENTS

WO    WO 2012/164363 A1    12/2012
WO    WO 2013/121492 A1    8/2013

OTHER PUBLICATIONS

International Search Report and Written Opinion dated Jan. 8, 2014 from corresponding International Application No. PCT/CA2013/050791, 10 pages.
"802® IEEE Standard for Local and Metropolitan Area Networks: Overview and Architecture," IEEE Computer Society Std® 802-2001, Mar. 8, 2002, 47 pages.
"Solution for Trusted WLAN Access to EPC," TD S2-1131481, 3GPP TSG SA WG2 Meeting #86, Intel, Cisco, Jul. 11-15, 2011, Naantali, Finland, 7 pages.
"Technical Specification Group Services and System Aspects: 3GPP System to Wireless Local Area Network (WLAN) Interworking: System Description," ETSI TS 123 234 V11.0.0, 3GPP TS 23.234 version 11.0.0 Release 11, Sep. 18, 2012, 86 pages.

* cited by examiner

*Primary Examiner* — Chandrahas Patel (74) *Attorney, Agent, or Firm* — Conley Rose, P.C.; J. Robert Brown, Jr.

(57) ABSTRACT

A mobile device may communicate through multiple access point names (APNs) through wireless local area network (WLAN) protocols. The APNs are data routes that may be accessible to a device through other non-WLAN networks (e.g. cellular), but can be accessed with a WLAN device through WLAN protocols. A sub network access protocol (SNAP) header may be modified and used for routing traffic.

23 Claims, 8 Drawing Sheets

COMMUNICATION LAYER ARCHITECTURE

MULTIPLE ACCESS POINT NAME AND IP SERVICE CONNECTIVITY

BACKGROUND

Wireless network deployments, such as wireless local area networks ("WLANs"), allow mobile devices to access network and Internet services when within proximity of wireless communication signals of those wireless networks. A WLAN device may not be able to connect with a core network (e.g. cellular network or evolved packet core {"EPC"}) and the different services provided through that core network (e.g. through Access Point Names {"APNs"}). Since APNs are basically point to point ("PPP") links, they may not map to Local Area Network ("LAN") systems, such as a WLAN. Although overlay mechanisms and tunneling mechanisms may allow connectivity, those devices may not be able to select the service or connect with multiple services because of WLAN limitations. The mobile device may only be capable of connecting with a single APN.

DETAILED DESCRIPTION

The disclosed systems and methods allow multiple access point names ("APNs"), from a core network, to be mapped to (i.e., associated with) a wireless local area network ("WLAN") device (e.g. IEEE 802.11), while maintaining full internet protocol ("IP") connectivity to a local area network ("LAN"). As described below, a modified protocol type (e.g. in IEEE 802) may be re-used to indicate cellular network bearer traffic including both user plane (APN) and control plane traffic. In one embodiment, the Logical Link Control ("LLC") or sub network access protocol ("SNAP") header may be used to indicate core network traffic and differentiate the core network traffic from LAN IP traffic. This allows a WLAN device to select and access multiple core network bearers without IP tunnelling or without using an overlay application. This capability may unify requirements for a $3^{rd}$ Generation Partnership Project (3GPP) network (e.g. a cellular network) to be enabled on a WLAN device. This capability may be advertised to the mobile devices. Also, core network operators may have greater control of a mobile device's connection to the Internet.

Figure 1:
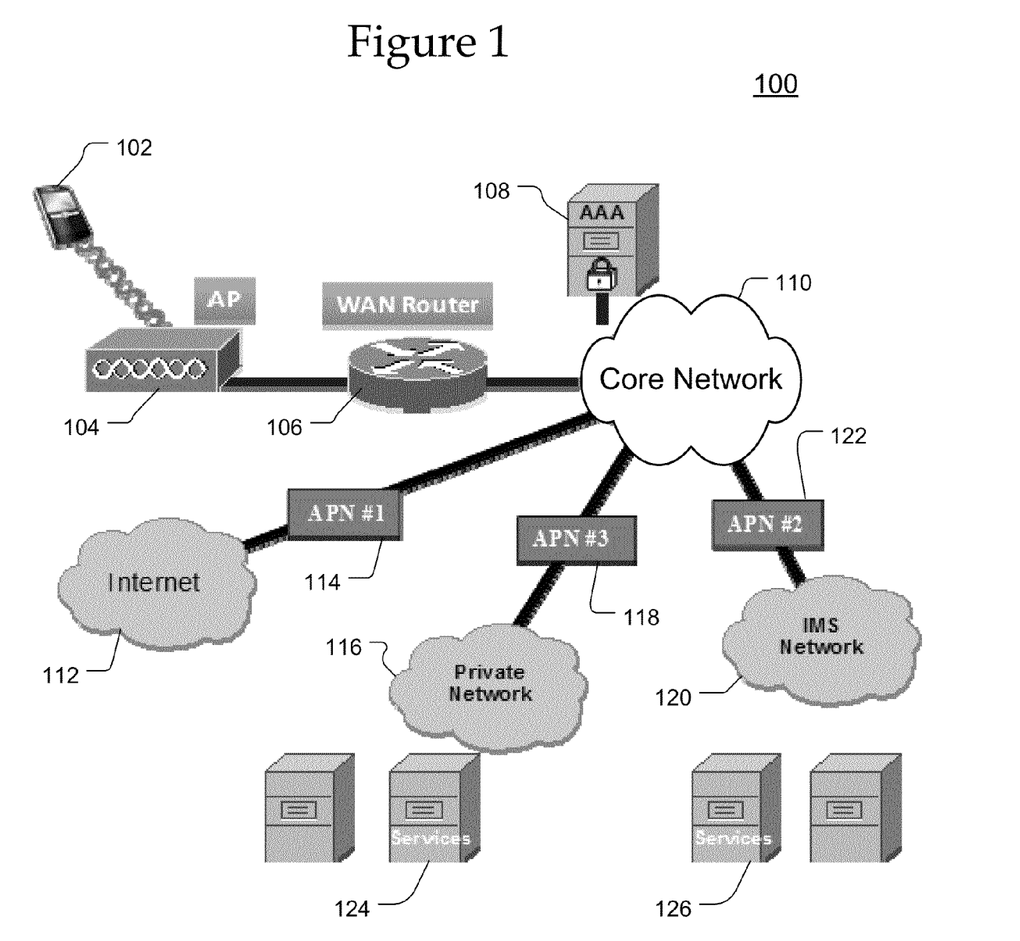
FIG. 1 illustrates a communication network.

FIG. 1 illustrates a communication network 100. In particular, FIG. 1 illustrates a mobile device 102, which may also be referred to as a user element ("UE") or a mobile station ("MS") that connects through multiple APNs. As described and shown in the figures, an APN is one example of a core network bearer. The mobile device 102 may be configured as a WLAN and/or a core network (e.g. cellular) device. The mobile device 102 is further described with respect to FIG. 6. As shown, in FIG. 1, the mobile device 102 is a WLAN device that routes traffic through the core network 110 to APNs. A WLAN mobile device 102 may not route all traffic through the core network as further described below with respect to FIG. 2. With changes to the LLC protocol, the mobile device 102 may be a WLAN device that can also route traffic through the core network as described with respect to FIG. 3.

An APN may be a data route for accessing different services (e.g. Internet, email, IMS, gaming, streaming video etc.). In other words, an APN provides different mechanisms for an operator to assign resources/services. The APN may also be referred to as a tunnel and there may be multiple tunnels from a core network for providing different services. The APN may be a character string that contains a reference to a Packet Data Network ("PDN") where the desired services are available. The network uses the APN when selecting the PDN to which the WLAN device connection should be established. The operator may define what APN's (and corresponding PDNs) are available to a user as part of their subscription. The operator may be the operator or owner of the core network (e.g. a cellular network owner such as VERIZON or AT&T). The network may use a default APN defined as part of a user's subscription profile in order to establish the PDN connection. The APN may be used to select not only the PDN but also the PDN gateway providing access (i.e., connectivity) to that PDN.

The communication network 100 illustrates a device that can simultaneously access multiple PDNs corresponding to one or more APNs. In particular, APN #1 114 provides access to the Internet 112. In other words, the Internet is a PDN or service provided through the first APN 114. The second APN 122 provides access to an IP multimedia subsystem ("IMS") network 120. The IMS network 120 includes one or more services 126, such as voice over IP ("VoIP"). Finally, the third APN 118 provides access to a private network 116. The private network 116 includes one or more services 124. The APNs in the communication network 100 provide the mobile device 102 access to a variety of services 124, 126 or to private/public networks, including the Internet.

The mobile device 102 connects (i.e., communicates) with an access point ("AP") 104 as well as a wide area network router 106. The AP 104 may be a WLAN compatible hotspot and is further described with respect to FIG. 7. The hotspot (e.g. the AP 104) is operated by an integrated service provider ("SP"), who has both WLAN and a core network 110, such as a cellular access network. The core network 110 may be a cellular network (in accordance with 3GPP specifications) that is operated by an integrated SP or cellular provider. For example, operators of the core network 110 may include VERIZON WIRELESS, AT&T, or SPRINT as a few examples. There may be an authentication, authorization, and accounting (AAA) server 108 associated with the core network 110. The AAA server 108 may select the destination network to which the mobile device 102 connects and therefore the set of services the mobile device 102 can access. The destination network selected by the AAA server 108 may be the equivalent of the core network/packet data network corresponding to an APN in the case of 3GPP evolved packet core ("EPC") connectivity. The EPC is an example of a 3GPP core network. Conversely, a non-seamless wireless offloading ("NSWO") connection may be available directly to the Internet without being routed through the EPC. NSWO traffic may not correspond to an APN or PDN connection. Without the changes to the LLC protocol, the mobile device 102 would not know whether an internet connection was through the EPC or NSWO. In other words, without the changes to the LLC protocol, the mobile device 102 would not be able to distinguish between data traffic received via a NSWO connection and data traffic received via the EPC (i.e., traffic routed through particular APN(s)).

The mobile device 102 connects with the APNs and the services from those APNs through the core network 110 as shown in FIG. 1. As described below, when the mobile device 102 is a WLAN device, it may still connect through multiple APNs and may be able to select from those APNs. The mobile device 102 should be able to connect to all three destination networks (112, 116, 120) concurrently and the services (e.g. mobile applications) using a destination network (identified by the destination network's APN). Those services may be provided through WLAN as well as the cellular network. Accordingly, when the device is relocated between WLAN's, those services may continue to work properly. Previously, support for multiple APNs would have required the mobile device 102 to support multiple IP interfaces (one for each APN), but as described below, the mobile device 102 utilizes changes in the LLC protocol to support multiple APNs.

The WLAN may be associated with a Dynamic Host Configuration Protocol Server ("DHCP") that allows the allocation of IP addresses to that WLAN. The WLAN may have a direct connection to the Internet, for non-3GPP traffic, together with a direct connection to the EPC for 3GPP traffic (or "EPC-routed" traffic). It is the WLAN that decides the route to take for traffic relayed from the mobile device 102. From a 3GPP architecture point of view, the WLAN may be considered to be a trusted non-3GPP access network.

The changes to the LLC protocol enable the mobile device 102 to receive an indication of the type of connectivity available. For example, the mobile device 102 may determine, based on the indication, whether the traffic is routed via a NSWO connection or the traffic is routed through particular APNs via EPC. Further, with respect to user plane data transmissions over the WLAN (i.e. transport of the device IP traffic), NSWO connectivity may be concurrent with traffic routed through the EPC. Further, there may be concurrent connectivity via multiple EPC APNs. The WLAN service provider (or operator of the network) may block NSWO connectivity to ensure that all traffic is routed through the EPC.

Figure 3:
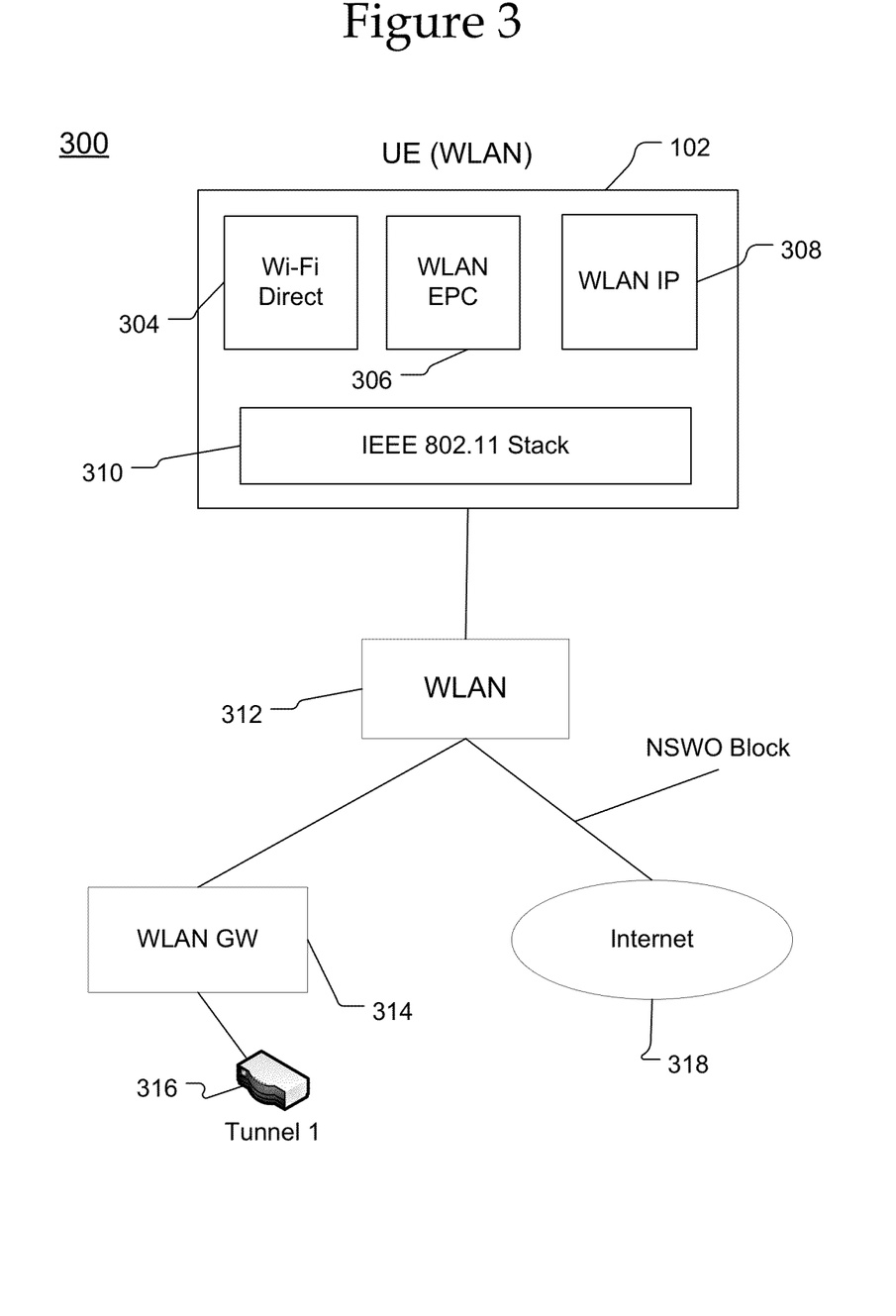
FIG. 3 illustrates an embodiment of communications in a network.

The potential changes to the LLC protocol may be reflected in changes to IEEE 802 protocols, including Ethernet. WLAN may be considered to be a wireless version of Ethernet. Ethernet is a mechanism for passing packets over a wired network, but operates by waiting for the wire (i.e., the wired connection) to be free of traffic. The wire is configured to transmit data when the wire is free of traffic. Conversely, a cellular network may have a slotted arrangement in which senders wait for their turn. The headers of IEEE 802 packets may have a source address, a read destination address and a protocol type. Within the protocol type, there may be many different subfields, such as the sub network access protocol ("SNAP") header. In one embodiment, the SNAP Protocol Type ("SPT") is 0x0800 which signifies that the IP traffic should be routed according to the Internet Protocol ("IP"). When a WLAN or WLAN gateway ("GW") 314 detects traffic that includes a SPT of 0x0800, the traffic will be routed as IP traffic based on IP. The IP traffic is routed based on IP using the source address and the destination address. The WLAN sends this traffic as IEEE 802 frames over the wireless interface, which is subject to the WLAN protocols of IEEE 802.11, which is a wireless version of IEEE 802.

In IEEE 802.11 protocols, the identity of the upper layer protocol to handle the contents of IEEE 802.11 MAC frames may be identified by the LLC header and SNAP header. The inclusion of the SNAP header is indicated by an LLC SAP ("LSAP")=0xAA. The SNAP header may be five octets long and includes an organizational unit identifier ("OUI" or "SNAP OUI") and protocol type ("SPT"). The protocol type may be equivalent to the Ethernet type field used in the MAC header of Ethernet frames.

An alternate SPT in Table 1 may be used to indicate other types of IP traffic. It may be the SPT that is used to identify whether the traffic exchanged between the mobile device and the network corresponds to an APN (and therefore needs to be routed to/from the EPC) or whether the traffic corresponds to NSWO (e.g. traffic for the Internet which is not routed to/from the EPC). SPT may be used by the mobile device on the uplink transmission and by the network (e.g. the WLAN AP, etc.) on the downlink transmission within the SNAP LLC header to indicate that the IP traffic being transported corresponds to traffic for an APN, and differentiate the traffic from NSWO traffic.

TABLE 1

| IEEE 802 Frame with SNAP Protocol Type ("SPT") | | | | | | | | |
|---|---|---|---|---|---|---|---|---|
| MAC Destination | MAC Source | Length | LLC Destination SAP = 0xAA | LLC Source SAP = 0xAA | SNAP OUI = 0x000000 | SPT (SNAP Protocol Type) = 0x0802 | IP Traffic | FCS |
| MAC Header | | | LLC Header | | SNAP Header | | | |

The SPT may be used to indicate the way in which the IP traffic is routed. For example, a SPT having a value of 0x0801 may indicate NSWO traffic, while the SPT having a value of 0x0802 indicates EPC traffic. Previously, WLAN devices required a value of 0x0800 to indicate that IP traffic be routed according to the Internet Protocol ("IP"), but that value is replaced by new SPT values (e.g. 0x0801 or 0x0802), which allows changes to the way in which traffic is routed by infrastructure.

Previously, SNAP was designed to permit multiplexing and demultiplexing of private and public protocols among multiple users of a data link. An organization that has an organizational unit identifier ("OUI") assigned to the organization may use its OUI to assign universally unique protocol identifiers to the organization's own protocols, for use in the protocol identification field of SNAP protocol data units ("PDUs"). Further, the SNAP allows multiple network layer protocols to coexist in an IEEE 802 network and provides for the coexistence of multiple network layer protocols, the migration of existing networks to future standard protocols, and allows future higher layer protocols to be accommodated.

The MAC address is part of the MAC header that functions as a permanent address based on the equipment. The LLC header may be permanently set to 0xAA. The SNAP header and in particular, the SPT is modified so that WLAN devices can select multiple traffic routes, including both NSWO and EPC traffic. When those frames are received by a router or switcher, the traffic can be identified (as non-IP traffic) and routed appropriately. NSWO and EPC are merely exemplary of the types of traffic that may be defined with the SPT and there may be different or more types of traffic. Further, there may be multiple types of EPC traffic. The EPC traffic is routed differently than NSWO traffic and may be routed through APNs.

In an alternative embodiment, there may be a new identifier APN Traffic ID ("APN ID") in the (non-IP) payload of the APN data frames in order to identify, to the WLAN infrastructure, which APN tunnel the traffic maps to (e.g. identify a tunnel that will map to a GPRS Tunneling Protocol {"GTP"} tunnel), as shown in Table 2.

TABLE 2

| IEEE 802 Frame with additional APN ID | | | | | | | | | |
|---|---|---|---|---|---|---|---|---|---|
| MAC Destination | MAC Source | Length | LLC Destination SAP = 0xAA | LLC Source SAP = 0xAA | SNAP OUI = 0x000000 | SPT = 0x0802 | APN ID | IP Traffic | FCS |
| MAC Header | | | LLC Header | | SNAP Header | | | | |

The APN ID may be added by the mobile device on the uplink and the network on the downlink. This may allow the WLAN infrastructure to bridge the appropriate GTP tunnel in the core network and the traffic between the mobile device and the WLAN infrastructure. The APN ID can also be mapped to a Tunnel Endpoint Identifier ("TEID"), for example a GTP TEID.

In an alternative embodiment, the SPT may be modified to differentiate the traffic corresponding to different APNs for a device. In particular, the SPT for EPC traffic maybe defined in the format 0x09ab where "ab" is the APN ID discussed above and shown in Table 3.

TABLE 3

| IEEE 802 Frame with APN ID encoded within the SPT | | | | | | | | |
|---|---|---|---|---|---|---|---|---|
| MAC Destination | MAC Source | Length | LLC Destination SAP = 0xAA | LLC Source SAP = 0xAA | SNAP OUI = 0x000000 | SPT = 0x09ab | IP Traffic | FCS |
| MAC Header | | | LLC Header | | SNAP Header | | | |

The APN ID may be unique for a mobile device, but the APN ID is not unique for all the mobile devices served by the WLAN GW. Other solutions may be utilized where the SPT format includes a value specifically indicating NSWO and values specifically identifying, for a given mobile device, the traffic corresponding to different tunnels in the network or for identifying control plane signaling. Upon receiving uplink traffic from the mobile device with a SNAP LLC header containing the SPT indicating traffic is for EPC (i.e. not containing the SPT value corresponding to NSWO), the network (e.g. WLAN AP, or WLAN GW) maps (i.e., directs, associates, or routes) the IP traffic to the tunnel corresponding to the APN ID value and the 802.11 MAC address of this mobile device. By using a combination of the mobile device 802.11 MAC address, the SPT, and the APN ID (which is either encoded in the SPT or included as a separate field), the network can ensure a unique mapping between the IP traffic and the tunnel identifiers.

When the mobile device requests connectivity for NSWO, if the network (e.g., WLAN AP or WLAN GW) rejects NSWO connectivity for the mobile device, then the network and the mobile device may each store such information. The network and the mobile device may maintain this information for as long as the mobile device is connected to the current WLAN, or for a period of time that is implementation dependent. When a mobile device in a WLAN, for which NSWO has been rejected, generates NSWO traffic (e.g. traffic in which the SPT in the SNAP Header indicates 0x0801), the network (e.g., WLAN AP or WLAN GW) may drop such traffic.

In an alternative embodiment, there may be a new value for the SPT entitled 3GPP WLAN Tunneling Protocol ("3GPP WLAN-TP") which identifies traffic for a core network (also shown in Table 4). This may be similar to the SPT examples given above for EPC traffic, and may be an internationally recognized identifier reserved for 3GPP core network traffic. Table 4 also shows a new Bearer identifier ("BID"), in the (non-IP) payload of the data frame, which identifies to the WLAN infrastructure, a bearer that the traffic maps to, for example a PDN.

TABLE 4

| IEEE 802 Frame with Bearer ID ("BID") | | | | | | | | | |
|---|---|---|---|---|---|---|---|---|---|
| MAC Destination | MAC Source | Length | LLC Destination SAP = 0xAA | LLC Source SAP = 0xAA | SNAP OUI 0x000000 | SPT = "3GPP WLAN TP" | BID | IP Traffic | FCS |
| MAC Header | | | LLC Header | | SNAP Header | | | | |

A BID may be used to differentiate control plane traffic from user plane traffic as well as for differentiating multiple user plane bearers. The BID could be an information element containing extra information. The APN ID is an instance of a user plane bearer. The control plane can terminate in the device or WLAN GW.

In an alternative embodiment, there may be a new value for the SNAP OUI entitled "3GPP Specific Value" as shown in Table 5, which allows traffic within the TWAG to be directed in other ways based on cellular network defined behavior. The 3GPP Specific Value would be requested from the IEEE Registration Authority as an internationally recognized value.

TABLE 5

| IEEE 802 Frame with 3GPP Specific OUI | | | | | | | | |
|---|---|---|---|---|---|---|---|---|
| MAC Destination | MAC Source | Length | LLC Destination SAP = 0xAA | LLC Source SAP = 0xAA | SNAP OUI = "3GPP Specific Value" | SNAP Protocol Type = X | Payload | FCS |
| MAC Header | | | LLC Header | | SNAP Header | | | |

The SPT may be re-used as an alternative identifier for both user plane and control plane cellular network traffic. For example, with user plane traffic, the value X is a control plan negotiated value that corresponds to a specific PDN connection. With control plane traffic, the value X is defined in a 3GPP specification which indicates that the Payload field carries a control plane message between the WLAN mobile device 102 and the WLAN infrastructure.

Figure 2:
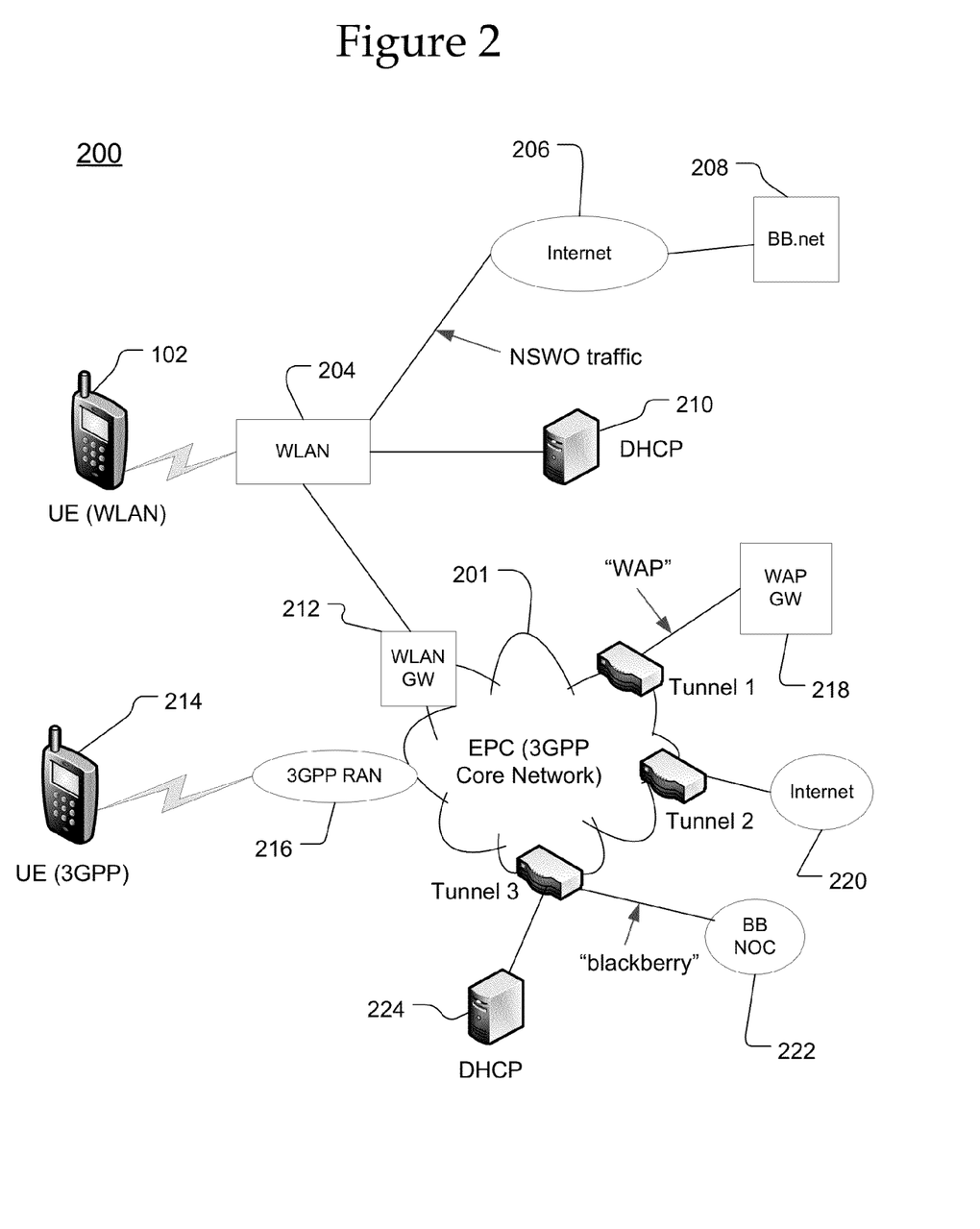
FIG. 2 illustrates an alternative communication network.

FIG. 2 illustrates an alternative communication network 200. In particular, FIG. 2 illustrates different routes that traffic would take for different devices. In particular, a WLAN mobile device 102 may route NSWO traffic from the WLAN 204 to the Internet 206 using an address provided by DHCP 210. Conversely, only the cellular mobile device 214 may have access to the core network 201. The core network 201 may be the same as the core network 110 described with respect to FIG. 1. As described herein, the SPT can be changed on a per packet basis within the WLAN mobile device 102, additionally access services through the core network while still transmitting/receiving NSWO traffic. The SPT therefore enables traffic from the WLAN mobile device 102 to be split between two destination networks (e.g. the Internet for NSWO traffic and the EPC for EPC traffic). As shown, the WLAN mobile device 102 utilizes a WLAN gateway ("GW") 212 to the core network. The cellular mobile device 214 utilizes a 3GPP radio access network ("RAN") 216 for connecting with the core network 201. As with FIG. 1, FIG. 2 illustrates a plurality of services through tunnels of the core network 201. In particular, a first tunnel provides access to a wireless application protocol ("WAP") GW 218, a second tunnel provides access to the Internet 220, and/or a third tunnel provides access to other services, such as BLACKBERRY-specific services 222 including email that may further utilize a DHCP server 224.

FIG. 3 illustrates an embodiment of communications in a network 300. In particular, a WLAN mobile device 102 may direct traffic through a WLAN 312 to the Internet 318 as NSWO traffic and/or to a first tunnel 316 through a WLAN gateway ("GW") 314 as EPC traffic. As discussed above, the redefined STP indicates the type of traffic with 0x0801 indicating NSWO traffic, and with 0x0802 indicating EPC traffic. The network 300 in FIG. 3 illustrates how a change in the STP may allow for different routes for traffic. If the STP was 0x0800, then the WLAN 312 would send all the traffic to one place (e.g. the Internet) since this traffic is routed according to the Internet Protocol (IP). By modifying the STP, the traffic may be split into NSWO traffic to the Internet 318 and traffic to the first tunnel 316 through the WLAN gateway 314. In one embodiment, NSWO traffic may still use the STP of 0x0800 and be routed to the Internet 318 according to the Internet Protocol (IP).

The updating of header information described herein may require that only the device and WLAN equipment software will need to be updated to bridge traffic according to the SNAP header. It may not be necessary for other routers and switches within a network (e.g. core network) to be modified for the transport of APN traffic.

In one embodiment, NSWO connectivity may be blocked (e.g. by a Hotspot or service provider) and traffic destined for the Internet may be routed through the core network or EPC. The operator can set a rule in the WLAN 312 that requires IP traffic with the STP set to 0x0800 to be not routed directly to the Internet, but to be routed to the core network. This is possible because the operator can manipulate the handling and routing of traffic, using the SPT and APN ID values. Further, traffic can be routed dynamically, or "on-the-fly", based on various operational factors in order to minimize congestion. For example, if the internet traffic is going through the core network and the core network becomes overloaded, that traffic can go back to the Internet, by changing either the SPT or APN ID, or both.

The mobile device 102 may include a plurality of drivers, such as a Wi-Fi Direct driver 304, a WLAN EPC driver 306, and a WLAN IP driver 308. The mobile device 102 includes an IEEE 802.11 stack 310 for communicating with a WLAN. The drivers may be implemented in software and may be responsible for selecting a route for the data. The drivers may determine the addressing and the routing of packets and may be on layer three (see FIG. 8). The WLAN IP driver 308 may route traffic through the internet which may be referred to as NSWO traffic. The WLAN EPC driver 306 routes traffic through the core network. The Wi-Fi Direct driver 304 may route traffic from one Wi-Fi Direct device to another.

Figure 4:
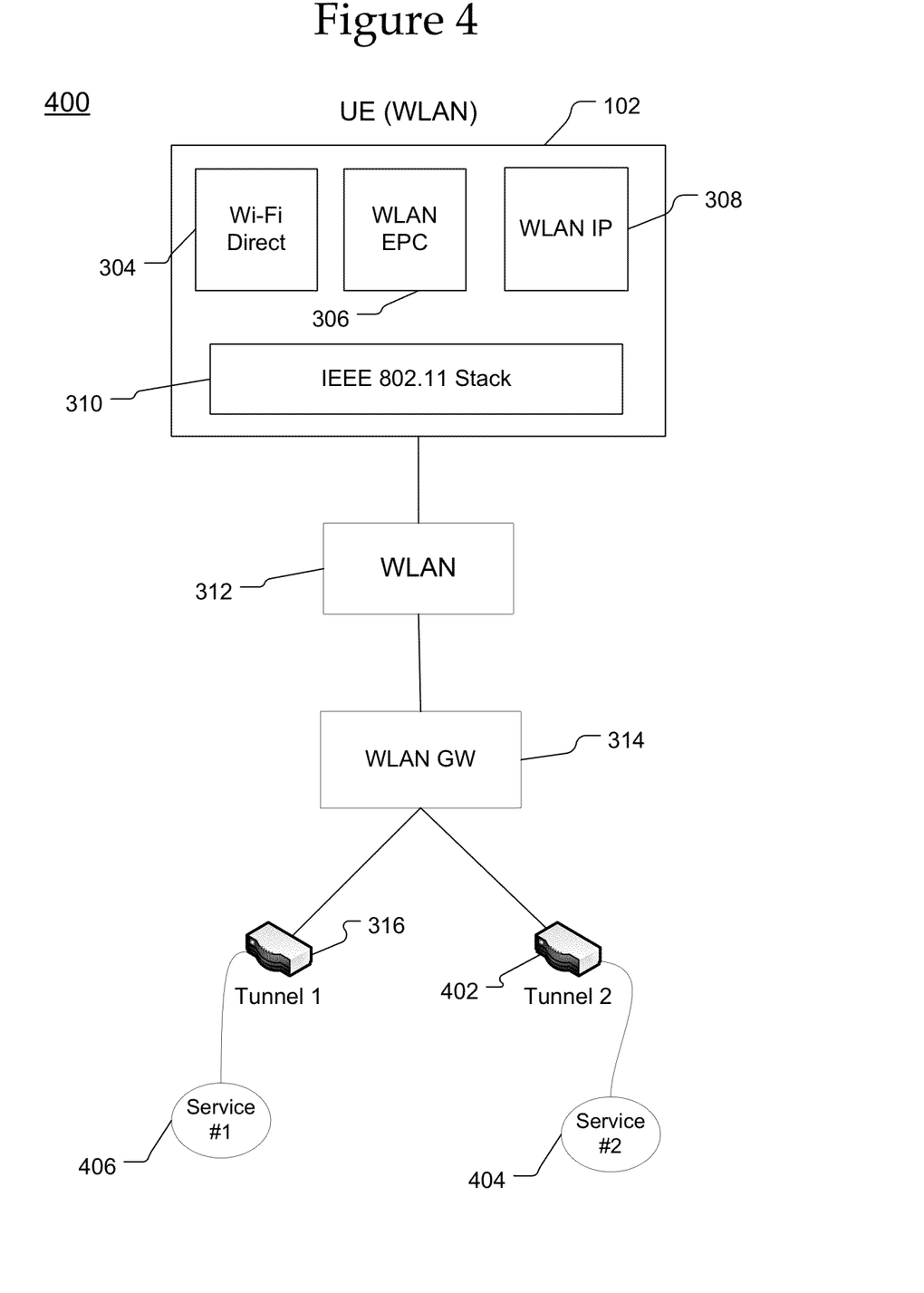
FIG. 4 illustrates an alternative embodiment of communications in a network.

FIG. 4 illustrates an alternative embodiment of communications in a network 400. FIG. 4 illustrates the WLAN GW 314 providing access to a first tunnel 316 and a second tunnel 402. The different tunnels may be through different APNs and may provide different services. For example, the first tunnel 316 may provide a first service 406, while the second tunnel 402 provides a second service 404. The traffic through the different tunnels may be referred to as tunnel traffic (e.g. first tunnel traffic is through the first tunnel 316).

FIG. 4 illustrates that APN traffic can be segregated into separate and distinct routes. APN data frames sent between the infrastructure and the mobile device 102 may be marked with the SPT and an APN ID (e.g. a tunnel endpoint ID {"TEID"}) according to the source network that they are mapped to. The device negotiates a mapping of APN traffic to APN ID with the infrastructure when the device establishes access over that APN. The device further maintains a virtual network interface per PDN connection (e.g. per APN ID, etc.) and transmits traffic to/from an APN via the EPC or NSWO traffic through the WLAN GW (using the SPT).

A packet can be associated with a particular APN and inserted into the correct GTP tunnel. For EPC traffic, the mobile device and the network may add an APN ID between the SNAP header (either encoded within the SPT {Table 3} or included as a separate field {Table 2}) and the encapsulated IP packet that identifies the core network tunnel on which traffic needs to be routed. Traffic is then marked according to the SPT and/or APN ID. On the "uplink", the trusted non-3GPP entity (e.g. WLAN GW, etc.) may strip (i.e., remove) the SNAP header off, but maps the encapsulated IP packet to the appropriate GTP tunnel, using the APN ID (or TEID). For backwards compatibility, the STP of 0x0800 may need to be reserved for legacy IP traffic.

Figure 5:
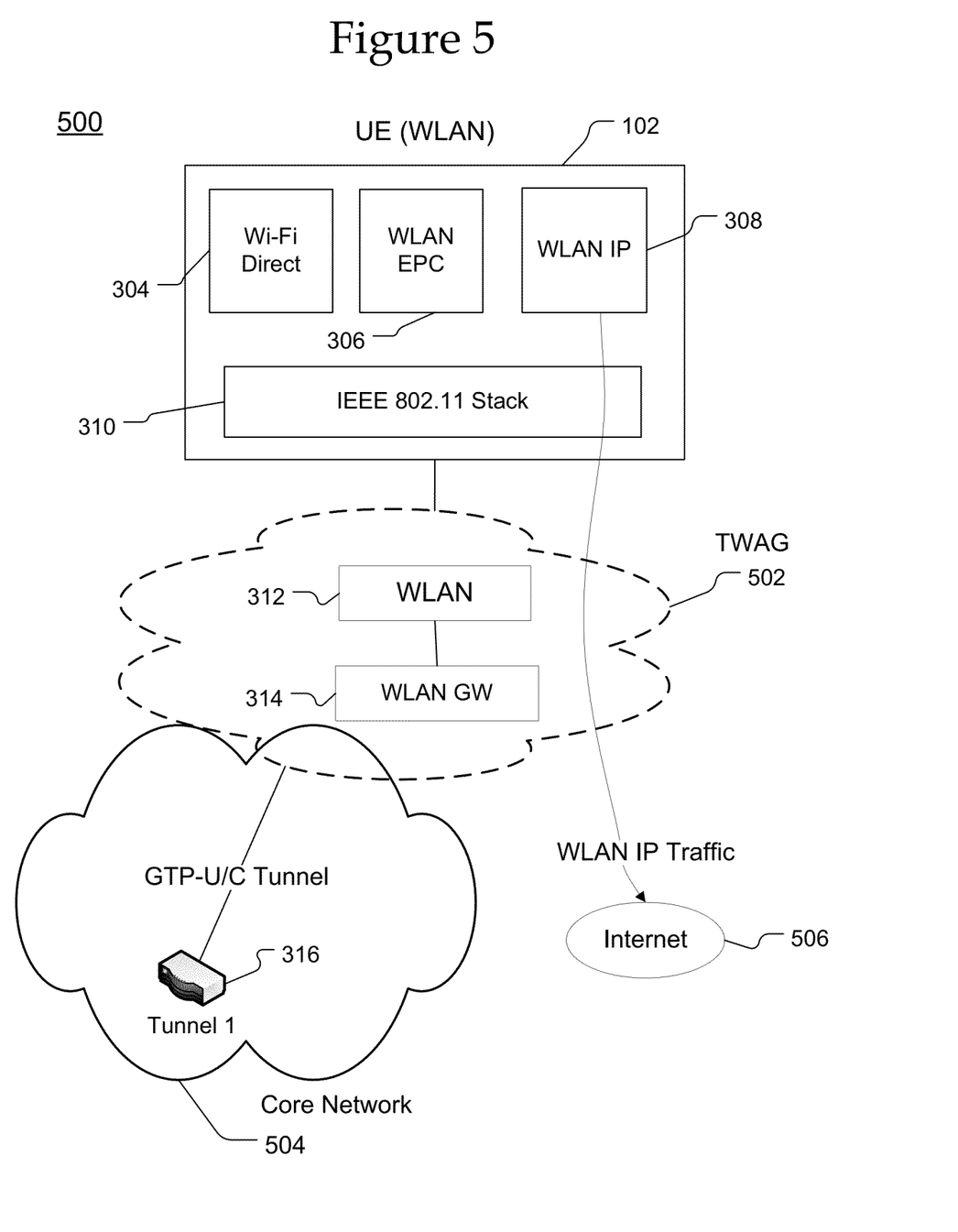
FIG. 5 illustrates another alternative embodiment of communications in a network.

FIG. 5 illustrates another alternative embodiment of communications in a network 500. As discussed above, the WLAN IP driver 308 may be used for routing NSWO or WLAN IP traffic to the Internet 506. FIG. 5 illustrates an alternative embodiment that utilizes a trusted wireless access gateway ("TWAG") 502. The TWAG may be an existing 3GPP concept that incorporates the functionality of the WLAN infrastructure and WLAN Gateway. The operation of the TWAG may be modified to map and route traffic flows based on the use of the SPT and APN IDs as described. Accordingly, the TWAG may encompass WLAN GW features.

The WLAN GW 314 maps each APN traffic flow (indicated by the SPT together with a specific APN ID {TEID}) to a GTP tunnel, which is then forwarded to the relevant APN terminating point within the core network 504 (or the EPC). The WLAN GW 314 may be logically located on the edge of the core network 504.

The core network 504 establishes a GTP (GPRS Tunnelling Protocol) tunnel between the WLAN GW 314 and each PDN that is associated with a particular APN. GPRS is the data service for GSM networks that enables sending of packet data over a GSM link. The traffic to or from each Packet Data Network which is associated with an APN may be transferred between the core network 504 and the WLAN GW 314 using a specific GTP tunnel 316. The services available on each packet data network may be different.

Upon receiving uplink traffic from the mobile device with a SNAP LLC header containing the SPT, the TWAG 502 routes the traffic as NSWO (e.g. towards the Internet 506) or towards the core network 504 depending on the value of the SPT. Upon receiving traffic from the Internet 506 destined for (i.e., addressed to) the mobile device 102, the TWAG 502 determines that the traffic is NSWO based on a value of the SPT indicating that the traffic is NSWO. Upon receiving traffic from the core network 504 destined for (i.e., addressed to) the mobile device 102, the TWAG 502 determines that the traffic was transmitted from an APN (i.e., the traffic is EPC traffic) based on a value of the GTP indicating that the traffic is associated with an APN.

Likewise, traffic containing an APN ID may be mapped to the corresponding GTP tunnel. The TWAG 502 may map the GTP tunnel to the appropriate APN ID and forward traffic to the mobile device 102 based on a value of the SPT indicating that the traffic corresponds to an APN, and adding the appropriate APN ID value (this may be encoded as a separate field {Table 2} or as part of the SPT itself {Table 3}). The MAC address and the APN ID value may be unique at the TWAG 502 or WLAN level in order to perform correct mapping between the traffic over WLAN and the GTP tunnels.

Figure 6:
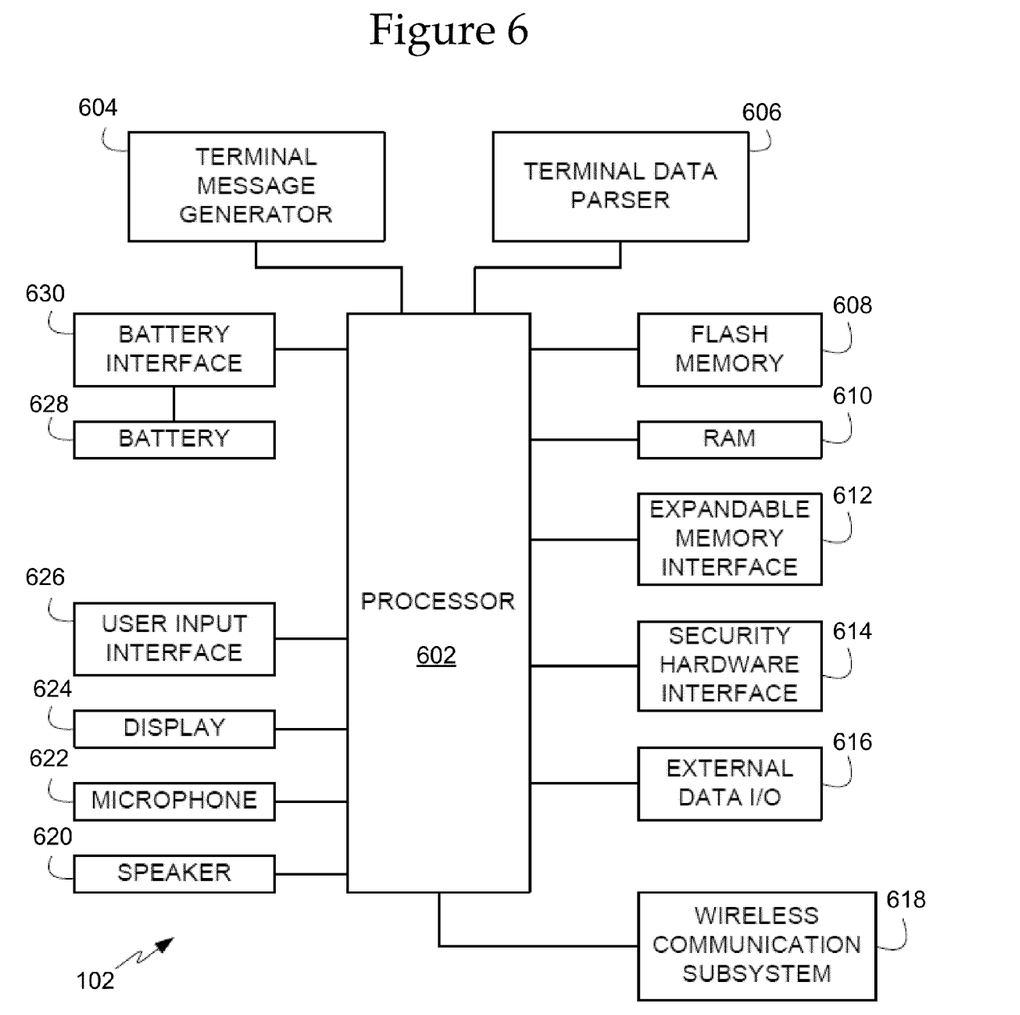
FIG. 6 illustrates a mobile device ("STA")

FIG. 6 illustrates a mobile device 102 as shown in FIGS. 1-5. In alternative embodiments, the user element ("UE") device 214 shown in FIG. 2 may also be the mobile device 102 described with respect to FIG. 6. Mobile device 102 may include mobile communication devices, mobile computing devices, or any other device capable of communicating wirelessly with a wireless network. Such devices may also be referred to as terminals, mobile devices, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc. FIG. 6 illustrates one embodiment of a mobile device.

The mobile device 102 includes a processor 602 that may be used to control the overall operation of the mobile device 102. The processor 602 may be implemented using a controller, a general purpose processor, a digital signal processor, dedicated hardware, or any combination thereof. The processor 602 may include a central processing unit, a graphics processing unit, a digital signal processor or other type of processing device. The processor 602 may be a component in any one of a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may operate in conjunction with a software program, such as code generated manually (i.e., programmed).

The mobile device 102 also includes a terminal message generator 604 and a terminal data parser 606. The terminal message generator 604 may generate advertisement messages as discussed below. The terminal data parser 606 may be used to retrieve network information from memory (e.g., random access memory 610, etc.). For example, the terminal data parser 606 may request service information from a WLAN to identify services available to the network.

In the illustrated embodiment, the terminal message generator 604 and the terminal data parser 606 are shown as separate from and connected to the processor 602. In alternative embodiments, the terminal message generator 604 and the terminal data parser 606 may be implemented in the processor 602 and/or in a wireless communication subsystem (e.g., a wireless communication subsystem 618). The terminal message generator 604 and the terminal data parser 606 may be implemented using any combination of hardware, firmware, and/or software. For example, one or more integrated circuits, discrete semiconductor components, and/or passive electronic components may be used. For example, the terminal message generator 604 and the terminal data parser 606, or parts thereof, may be implemented using one or more circuits, programmable processors, application specific integrated circuits, programmable logic devices, field programmable logic devices, etc.

The terminal message generator 604 and the terminal data parser 606, or parts thereof, may be implemented using instructions, code, and/or other software and/or firmware, etc. stored on a machine accessible medium and executable by, for example, a processor (e.g., the processor 602). The terminal message generator 604 or the terminal data parser 606 may be stored on or include a tangible storage medium or memory. For example, the terminal message generator 604 or the terminal data parser 606 may be implemented in software stored on a memory that is executable by the processor 602. Alternatively, the terminal message generator 604 and/or the terminal data parser 606 may be implemented in hardware with software functions. The memory for storing software associated with the terminal message generator 604 and/or the terminal data parser 606 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 610 for the processor 602, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 602.

The mobile device 102 may include a FLASH memory 608, a random access memory 610, and/or an expandable memory interface 612 coupled with the processor 602. The FLASH memory 608 may store computer readable instructions and/or data. In some embodiments, the FLASH memory 608 and/or the RAM 610 may store SPT header information and instructions for communicating and advertising that information. The processor 602 may be coupled with the memory (e.g. the FLASH memory 608, or the RAM 610) for storing software instructions executable by the processor 602. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 602 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 102 may include a security hardware interface 614 to receive a SIM card from a wireless service provider. A SIM card may be used for communications including authentication of the mobile device 102 for establishing a connection with a WLAN-supported network. The mobile device 102 may be provided with an external data I/O interface 616. The external data I/O interface 616 may be used by a user to transfer information to the mobile device 102 through a wired medium.

The mobile device 102 may include wireless communication subsystem 618 to enable wireless communications with access points (e.g., the AP 104). Although not shown, the mobile device 102 may also have a long-range communication subsystem to receive messages from, and send messages to, a cellular wireless network. In the illustrated examples described herein, the wireless communication subsystem 618 can be configured in accordance with the IEEE® 802.11 standard. In other example implementations, the wireless communication subsystem 618 may be implemented using a BLUETOOTH® radio, a ZIGBEE® device, a wireless USB device, an ultra-wideband radio, a Near Field Communications ("NFC") device, or a Radio Frequency Identifier ("RFID") device.

The mobile device 102 may include a user interface for communicating with the mobile device. The user interface may be separate component or it may include a speaker 620, a microphone 622, a display 624, and a user input interface 626. The display 624 may be a liquid crystal display, an organic light emitting diode, a flat panel display, a solid state display, a cathode ray tube, a projector, a printer or other now known or later developed display device for outputting determined information. The user input interface 626 may include alphanumeric keyboard and/or telephone-type keypad, a multi-direction actuator or roller wheel with dynamic button pressing capability, a touch panel, etc. The speaker, 620, the microphone 622, the display 624, the user input interface 626, and/or any combination thereof may be omitted in alternative embodiments. In one embodiment, the mobile device 102 is a battery-powered device and includes a battery 628 and a battery interface 630.

Figure 7:
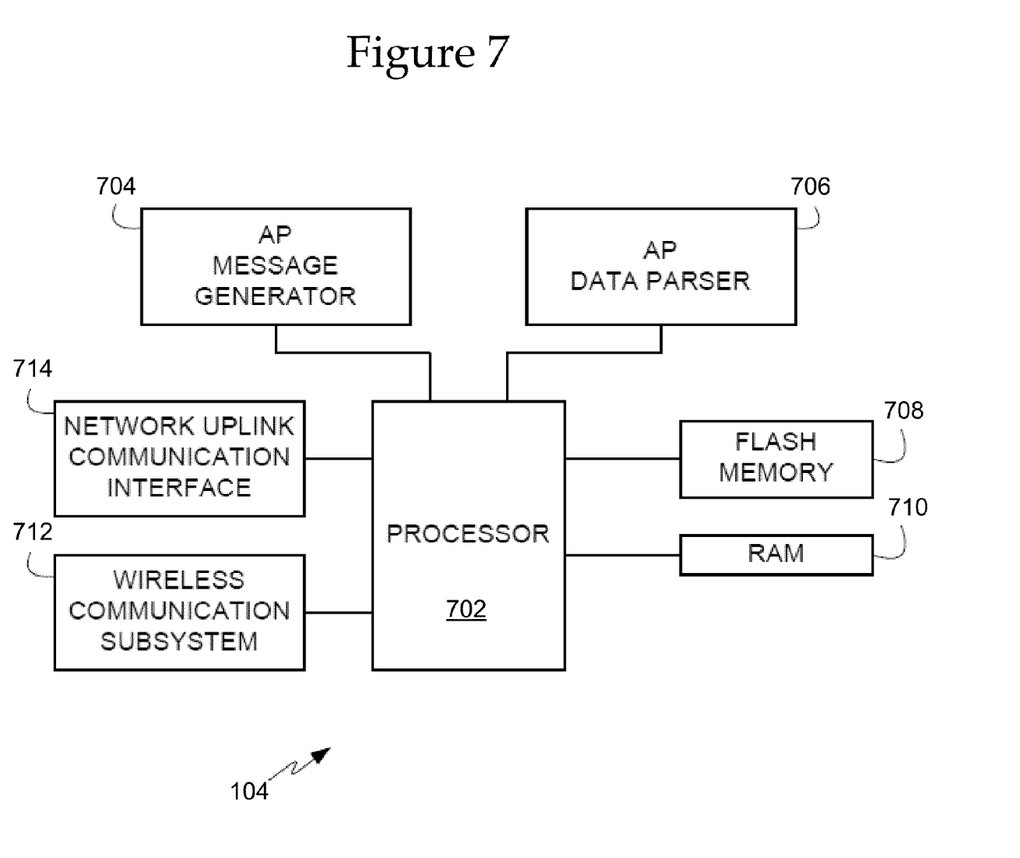
FIG. 7 illustrates an access point ("AP")

FIG. 7 illustrates an access point ("AP") 104. The access point shown in FIG. 7 is AP 104, but may also be illustrative of other access points. Some WLAN locations or environments, including APs, may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee).

AP 104 includes a processor 702 to perform operations of the AP 104. The processor 702 may be similar to the processor 602 described above. The AP 104 includes an access point message generator 704 to generate service information communications and an access point data parser 706 for retrieving service information communications from the mobile device 102 and/or an external network. The access point message generator 704 may be similar to the terminal message generator 604 of FIG. 6, and the access point data parser 706 may be similar to the terminal data parser 606 of FIG. 6. As with the terminal message generator 604 and the terminal data parser 606 of FIG. 6, the access point message generator 704 and the access point data parser 706 may be implemented in software stored on a memory that is executable by the processor 702 or may be implemented in hardware with software functions executed by the processor 702. Alternatively, the access point message generator 704 and the access point data parser 706 may be implemented in a wireless communication subsystem (e.g., a wireless communication subsystem 712) using any combination of hardware, firmware, and/or software including instructions stored on a tangible computer readable medium and/or a non-transitory computer readable medium.

The AP 104 may also include a FLASH memory 708 and a RAM 710, both of which are coupled to the processor 702. The FLASH memory 708 and/or the random access memory ("RAM") 710 may be configured to store network information (e.g., multi-APN and multi-tunnel information). The RAM 710 may also be used to generate messages for communication with the mobile device 102 and/or to an external network. The RAM 710 may also store received messages communicated by the mobile device 102 and/or the external network. To communicate with mobile devices such as the mobile device 102, the AP 104 may include a wireless communication subsystem 712, which may be similar to the wireless communication subsystem 618 of the mobile device 102 illustrated in FIG. 6. To communicate with a WLAN-supported network or external network, the AP 104 may include a network uplink communication interface 714.

Figure 8:
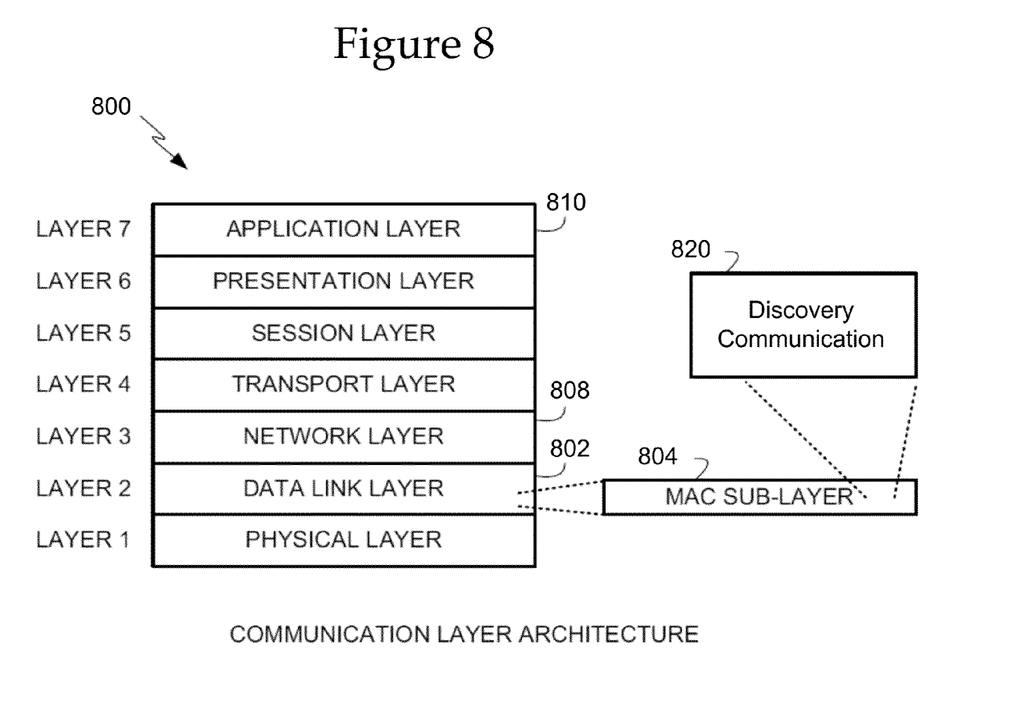
FIG. 8 illustrates a communication layer architecture.

FIG. 8 illustrates a communication layer architecture 800. As described above, the changes to the SPT header and the SNAP protocol may be at layer 2 or layer 3 underneath the transport level. The communication layer architecture 800 includes seven layers which may be implemented in accordance with the Open Systems Interconnection ("OSI") Reference Model. The communication layer architecture 800 includes a data link layer 802, which includes a media access control ("MAC") sub-layer 804. The MAC sub-layer provides addressing and channel access control mechanisms that make it possible for several devices or network nodes to communicate within a multiple access network that incorporates a shared medium, e.g. Ethernet. The hardware that implements the MAC may be referred to as a medium access controller. The MAC sub-layer acts as an interface between the logical link control ("LLC") sub layer and the network's physical layer. The MAC layer emulates a full-duplex logical communication channel in a multi-point network. This channel may provide unicast, multicast or broadcast communication service Mobile devices (e.g., the mobile device 102) may provide service requests or discovery communications 820 with wireless APs (e.g., AP 104) at the MAC sub-layer 804. The discovery communications 820 may include an advertisement of multi-APN capability as discussed below. A mobile device may access information from a memory or other hardware of the mobile device at the MAC sub-layer 804 without needing to perform operations at or above an internet protocol layer (e.g., a network layer 808) and without needing to provide access to the internet protocol layer. Mobile devices (e.g., the mobile device 102) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Some communications or authentication techniques that use hypertext transfer protocol ("HTTP") or other internet protocol processes may require establishing a connection between a mobile device and a wireless access point at one or more of the layers between and including the network layer 808 and an application layer 810 of the communication layer architecture 800. In these applications, discovery communications 820 may not require a connection or access to the network layer 808 or any layers within a protocol suite. An inclusion of a discovery communication 820 on the MAC sub-layer 804 may allow for a mobile device to communicate with a network without associating with the network. Discovering service information available via access points using the MAC sub-layer may be used for identifying services that are provided.

In order for WLAN devices to utilize the multi-APN features and access those services provided through EPC, the devices and the network may communicate compatibility with that multi-APN capability. The network and/or mobile devices may advertise multi-APN capability support. In one embodiment, a new element within IEEE 802.11 may allow APs to advertise (i.e., transmit information that indicates) that the APs support this new mechanism (multiple APN support). In one embodiment, the advertisement is provided before WLAN association. An APN identifier "APN ID" may be included in the (non-IEEE 802) payload of the APN data frames to identify the APN to the WLAN infrastructure. This allows the WLAN infrastructure to bridge the APN traffic, from the mobile device through to the appropriate destination. This may be accomplished with new values of the SPT (either within IEEE 802 or 3GPP specifications). APs can advertise that the APs support this new mechanism (multiple APN support) either by adding a new bit to the extended capability frame or through the creation of a new ANQP-element.

In one embodiment, the advertisement of this ability may be through the IEEE 802.11 extended capabilities element. The extended capabilities element may be modified to allow IEEE 802.11 devices (e.g. a mobile device and an AP) to advertise (e.g. within a beacon) the support of multiple APNs. The extended capabilities element may include a variable of type Boolean that is introduced to support this capability bit. When the variable is true, the field is set to 1 to indicate the mobile device supports multiple APNs. When the variable is false, the field is set to 0 to indicate the mobile device does not support multiple APNs.

In another embodiment, the advertisement of multi-APN compatibility may be through a new ANQP-element. The ANQP-element may be used so that devices can discover, in a pre-associated state, that APs (hotspots) that support multiple APNs/multiple tunnels. This mechanism may also be supported by Service Transaction Protocol ("STP"). Implementation of this ANQP-element could be by either creating an element with a simple flag (e.g. a single bit set to true/false) indicating multiple APN/Tunnel support in the hotspot, or alternatively a bit could be added to an existing ANQP-element (e.g. in the 3GPP Cellular Network Information element). The network and the mobile device respectively set this flag to true if the network and the mobile device each respectively support the multiple APN capability.

In another embodiment, the Wi-Fi Alliance Hotspot 2.0 Indication Element ("IE") and one of the reserved bits within the "Hotspot 2.0 Indication element" may be used for advertising support for multiple APNs or multiple tunnels.

Access Network Query Protocol ("ANQP") may be a protocol with which devices can advertise compatibility with the multiple APN mechanism while in a pre-association state (before network authentication/association). ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which are incorporated by reference. ANQP and GAS are further described below. Communications prior to network association may be referred to discovery communications or communications while a mobile device (also referred to as a UE or STA) is in a pre-associated state of operation in accordance with various communication standards such as the IEEE® (Institute for Electrical and Electronics Engineers) 802.11 standard. For example, as described in IEEE 802.11, a pre-associated state of a mobile device may include states such as, but not limited to, a "State 1: Initial start state, unauthenticated, unassociated" in which the device has neither authenticated or associated with a network and a "State 2: Authenticated, no associated" in which a mobile device has authenticated with a network but not yet associated with the network.

GAS may serve as a transport mechanism, at layer-2 (see e.g. FIG. 8), for an advertisement protocol. The advertisement protocol may connect the mobile device to one of several interworked servers. The advertisement protocol allows the transmission of frames between a mobile device and a server in the network prior to network connectivity. For example, GAS provides support for operations such as network selection by a mobile device, as well as for communication between the mobile device and other information resources in the network before the mobile device associates with a WLAN. The mobile device may be connected to a layer-2 radio service, without exchanging any authentication parameters or without having a recognized session (because no session keys are established and no internet protocol address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol, as an alternative to GAS. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if any EAP method using SIM based credentials (e.g. EAP-SIM, EAP-AKA, or EAP-AKA') were to be the authentication protocol, any advertisement protocol information encapsulated (i.e. securely carried) within a suitable EAP-TLV frame during the same EAP transaction may also be protected by the SIM credentials.

ANQP operates as a query and response protocol used by a mobile device to discover a range of information from a server including accessible roaming partners, internet protocol address type, and other metadata useful in the mobile device's network selection process. In addition to being defined in IEEE® 802.11u and IEEE 802.11-2012, additional ANQP messages may alternatively or additionally be defined in the Wi-Fi Alliance ("WFA") Hotspot 2.0 specifications, alternatively known as Wi-Fi Certified PassPoint. The WFA Hotspot 2.0 may also be referred to as WFA PassPoint. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af and Hotspot Registration Protocol (HRP) as defined in WFA Hotspot 2.0 specifications) may also be used. In alternative embodiments, other layer-2 transport mechanisms or even authentication mechanisms such as the Extensible Authentication Protocol (EAP) could be used to advertise messages, as an alternative to GAS.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The embodiments may not be independent and may be used in any combination. In other words, elements described from one embodiment may be utilized as part of another embodiment. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method comprising:
  advertising, by a wireless local area network ("WLAN"), a capability to access multiple access point names ("APNs") from a core network;
  receiving, from a WLAN device, a request for access to at least one of the APNs in the core network, wherein the capability comprises a modification of a protocol that allows the WLAN device to access services from the core network;
  in response to the request, connecting, via the WLAN, the WLAN device to at least one of the APNs through the core network; and
  modifying a sub network access protocol ("SNAP") header to include a type field that directs traffic through one of the APN paths, wherein the modified SNAP header comprises a SNAP Protocol Type ("SPT") and the type field comprises the SPT, the SPT comprising an APN Traffic ID ("APN ID") to identify which of the APN paths the traffic maps to.

2. The method of claim 1 wherein the core network comprises a cellular network.

3. The method of claim 1 wherein the APNs comprise tunnels that each provide access to a different service.

4. The method of claim 3 wherein the service comprises one of Internet, email, IP Multimedia Subsystem ("IMS"), video streaming, or gaming.

5. The method of claim 1 wherein to access to the multiple APNs is provided without IP tunneling or overlays.

6. The method of claim 1 wherein the a modification is of an IEEE 802 protocol.

7. The method of claim 1 wherein the SPT further comprises an identifier indicating that a payload carries a control plane message.

8. The method of claim 7 wherein the SPT further comprises a value which indicates that the control plane message is carried in the payload.

9. The method of claim 1 wherein the SPT further comprises an identifier for a packet data network ("PDN").

10. The method of claim 1 wherein the APN ID is a separate field in the SNAP header or is embodied as part of the type field.

11. The method of claim 1 wherein the SPT further comprises a 3GPP WLAN Tunneling Protocol identifier that directs traffic through a core network.

12. The method of claim 1 wherein a bearer identifier ("BID") is a separate field that is embodied as part of the type field.

13. The method of claim 6 further comprising:
modifying a sub network access protocol ("SNAP") header to include an OUI field that directs traffic according to 3GPP behavior.

14. A system that comprises:
an access point that provides a wireless local area network ("WLAN"); and
a cellular network that provides access through the WLAN to multiple tunnels using a modified WLAN protocol that allows WLAN devices to access services from the cellular network by modifying a sub network access protocol ("SNAP") header to include a type field that directs traffic through one of the APN paths, wherein the modified SNAP header comprises a SNAP Protocol Type ("SPT") and the type field comprises the SPT, the SPT comprising a WLAN Tunneling Protocol identifier that directs traffic through the cellular network.

15. The system of claim 14 wherein the tunnels comprise access point names, further wherein each of the tunnels provides access to one or more services.

16. A method for a wireless local area network ("WLAN") mobile device to communicate with a core network comprising:
advertising compatibility with a revised WLAN protocol that allows access to multiple access point names (APNs) through a WLAN;
receiving a request for access from the WLAN mobile device to at least one of the APNs, wherein the compatibility comprises a modification of a protocol that allows the WLAN mobile device to access services from the core network;
providing access through the core network for the WLAN mobile device to the request of at least one of the multiple APNs; and
modifying a sub network access protocol ("SNAP") header to include a type field that directs traffic through one of the APN paths, wherein the modified SNAP header comprises a SNAP Protocol Type ("SPT") and the type field comprises the SPT, the SPT comprising an identifier.

17. The method of claim 16 wherein the advertising comprises an access network query protocol ("ANQP") message.

18. The method of claim 16 wherein both the WLAN and the WLAN mobile device communicate using ANQP messages in a pre-associated state.

19. The method of claim 18 wherein the WLAN mobile device can refuse association with those WLANs that do not have compatibility with the revised WLAN protocol.

20. The method of claim 16 wherein the core network comprises a cellular network and services provided by the cellular network are accessed using the WLAN.

21. The method of claim 16 wherein the identifier comprises at least one of 1) an APN Traffic ID ("APN ID") to identify which of the APN aths the traffic maps to; 2) a 3GPP WLAN Tunnelin Protocol identifier that directs traffic through a core network; 3) an identifier indicating that a payload carries a control plane message; or 4) an identifier for a packet data network ("PDN").

22. The method of claim 20 wherein the each of the multiple APNs provides access to one or more of the services.

23. The method of claim 22 wherein the services comprise one of Internet, email, IP Multimedia Subsystem ("IMS"), video streaming, or gaming.

* * * * *